Patented Apr. 14, 1936

2,037,050

UNITED STATES PATENT OFFICE 2,037,050

PROCESS FOR MAKING OXYGEN CONTAINING PRODUCTS FROM HYDROCARBONS

Alfred Schaarschmidt, Berlin-Charlottenburg, Germany; Erna Magda Irmgard Schaarschmidt, sole heiress of said Alfred Schaarschmidt, deceased, assignor to Antares Trust Registered, Vaduz, Liechtenstein No Drawing. Application May 28, 1931, Serial No. 540,804. In Germany May 31, 1930

6 Claims. (Cl. 260—134)

The present invention is based on the surprising observation that valuable products such as ketones and in some instances aldehydes also can be obtained when natural or artificial aliphatic or alicyclic saturated non-aromatic hydrocarbons are treated under cooling to temperatures below 20° C., and under ordinary or higher pressure, with carbon monoxide, or substances containing carbon monoxide, in the presence of anhydrous aluminum bromide or aluminum iodide. It has also been ascertained that phosgene can be employed in place of carbon monoxide. The reaction recalls the known Friedel-Craft reaction, but differs, however, from this latter reaction, for example, in that the agents, i. e. the carbon monoxide or phosgene, act upon saturated non-aromatic aliphatic or alicyclic hydrocarbons. In contrast to the Friedel-Craft reaction, the present invention relates therefore to reactions in which hydrogen combined with aliphatic or alicyclic hydrocarbons is directly substituted.

As starting materials, therefore, I may use in the present invention natural or artificial hydrocarbons or mixtures including mineral oils, natural gases, lignite tars, cracking distillates, hydrolyzed products and the like from which the unsaturated and aromatic constituents have been removed. The reactive capacity of the various hydrocarbons may be found to be different. In my preferred operation I use tertiary carbon atoms although the normal hydrocarbons and quaternary or gaseous hydrocarbons may be satisfactorily used although it may be found in some cases that they react less rapidly.

The possibilities of transformation are numerous, and they are further increased owing to the different characteristics of the aliphatic and alicyclic hydrocarbons or hydrocarbon mixtures, occurring in nature or available synthetically. The raw materials when employed according to the present invention particularly in operating at low temperatures react to minimize the formation of undesired transformation products, by secondary reactions. If tertiary containing starting materials are used, the entry of the carbon monoxide or phosgene is on to the tertiary carbon atoms, and more uniform products are obtained. If normal hydrocarbons, are used as starting materials substitutions may take place at different points.

In the case, for example of carbon monoxide and tertiary containing material, the reaction very probably proceeds in the following manner. As already mentioned, the carbon monoxide attaches itself, in the first stage to the tertiary carbon atom, the primary product, with a free aldehyde group being formed. As a rule, this aldehyde undergoes intermolecular change and the aldehyde itself can be isolated by proper reactions at very low temperatures. The employment of phosgene furnishes ketones direct.

In operating at higher temperatures, the formation of the ketones is forced very considerably or completely into the background, and is replaced by the formation of other high-boiling resinous, viscous condensation or polymerization products. The yield of primary products increases, and that of secondary products diminishes with the lowering of the reaction temperature. Moreover, the formation of primary products is influenced by certain external conditions, such as the duration of the working operation, highly intensive manipulation of the reaction mixtures, application of high pressure during the action of gases, such as carbon monoxide, bringing the reaction components into contact in the requisite relative proportions, etc. The optimum conditions of temperature for the transformation also differ in the case of the various hydrocarbons but in all cases, lie not inconsiderably below the ordinary temperature. It is possible, by a suitable selection of temperature to ensure that only one or more of the mixed hydrocarbons will enter into reaction, the others remaining unaltered, so that hydrocarbon mixtures of simple composition, or even single hydrocarbons, can be obtained. In this case the difficultly reacting hydrocarbons remain unaltered. In the case of hydrocarbon mixtures containing hydrocarbons other than tertiary hydrocarbons the reaction may be so controlled that only the tertiary hydrocarbons react. In a similar manner, hydrocarbon mixtures of simple composition, or single hydrocarbons can be obtained by employing carbon monoxide, or phosgene, catalyzers, or both in amounts which are insufficient for the complete transformation of the hydrocarbons concerned and subsequently separating the unchanged hydrocarbons from the condensation product.

The possibilities of conversion, in accordance with my invention, are very numerous for various reacting agents can be used and also an exceedingly large number of natural and synthetic aliphatic and alicyclic hydrocarbons are available.

The transformations are preferably effected in intensive stirring, grinding, or kneading apparatus. The action of the apparatus may be assisted advantageously by forcing the reagent substances, or the hydrocarbon under treatment through the reaction mass by means of pumps or distributing nozzles. The resulting products both condensation products and the improved hydrocarbons are intended for the purposes of the perfumery, acid- and soap-industries, as solvents, lubricants, transformer oils and similar applications.

Example 1

72 parts of isopentane are placed in a cooled autoclave of acid proof alloy, equipped with horizontally mounted intensive-stirring mechanism, and treated at about 0° to 20° C. with a mixture of 270 parts of powdered aluminum bromide and 10 parts of chloride of monovalent copper, carbon monoxide being introduced with most intensive stirring under a pressure of up to about 80–100 atmospheres. Stirring is continued for about 4–8 hours longer, with replenishment of the consumed carbon monoxide and cooling the apparatus with a refrigerating mixture so that the carbon monoxide also comes into intimate mixture with the contact substance. The resulting oily mass is poured on to ice, and the precipitated condensation product is driven off with steam and distilled. In proceeding in this manner by the usual methods, a main product is obtained having a boiling point of about 117° C. together with small amounts of products of higher boiling point.

Example 2

A similar procedure is adopted for the transformation of natural pentane (boiling at 30–35° C.) which consists of normal and isopentane. For example, a mixture of pentane, aluminum bromide and chloride of monovalent copper, is placed in a pressure pipe fitted with intensive stirrers and the mixture maintained between 0 and 20° C., and a current of carbon monoxide under a pressure of 80–100 atmospheres is forced in through the mixture for several hours. The resulting oleaginous mass is separated from the unaltered hydrocarbon and decomposed by means of ice, the separated oil being subjected to steam distillation and then to dry distillation. It can be obtained in complete pure condition e. g. by distillation.

Example 3

100 parts of methylcyclohexane are treated with 262 parts of aluminum bromide and a little HCl gas at minus 15° C., and stirred most intensively with carbon monoxide under a continuous pressure of about 75 atmospheres. The resulting product can be decomposed or split up into valuable constituents for example by means of steam and fractional distillation.

I claim as my invention:

1. A process for the production of valuable products comprising ketones relatively free from gums, resins and other undesirable difficultly separable polymerized products from saturated non-aromatic hydrocarbons comprising reacting the hydrocarbons with an aluminum compound of a non-gaseous halogen and with carbon monoxide while withdrawing sufficient heat from the reactant mass to maintain the temperature below 20° C., maintaining pressure on said reactant mass, and decomposing the resulting reaction compound with water to form said ketones.

2. A process for the production of valuable products comprising ketones relatively free from gums, resins and other undesirable difficultly separable polymerized products from saturated non-aromatic hydrocarbons containing at least one tertiary carbon atom comprising reacting said hydrocarbons with an aluminum compound of a non-gaseous halogen and with carbon monoxide while withdrawing sufficient heat from the reactant mass to maintain the temperature below 20° C., maintaining pressure on said reactant mass, and decomposing the resulting reaction compound with water to form said ketones.

3. A process for the production of valuable products comprising ketones relatively free from gums, resins and other undesirable difficultly separable polymerized products from saturated non-aromatic hydrocarbons comprising reacting said hydrocarbons with aluminum bromide and carbon monoxide while withdrawing sufficient heat from said reactant mass to maintain a temperature below 20° C. but above 0° C., maintaining pressure on said reactant mass, and decomposing the resulting reaction compound with water to form said ketones.

4. A process for the production of valuable products comprising ketones relatively free from gums, resins and other undesirable difficultly separable polymerized products from saturated non-aromatic hydrocarbons containing at least one tertiary carbon atom comprising reacting said hydrocarbons with aluminum bromide and carbon monoxide while withdrawing sufficient heat from the reactant mass to maintain a temperature below 20° C. but above 0° C., maintaining pressure on said reactant mass, and decomposing the resulting reaction compound with water to form said ketones.

5. A process for the production of valuable products comprising ketones relatively free from gums, resins and other undesirable difficultly separable polymerized products from saturated non-aromatic normal hydrocarbons comprising reacting said hydrocarbons with aluminum bromide and carbon monoxide while withdrawing sufficient heat from said reactant mass to maintain a temperature below 20° C. but above 0° C., maintaining pressure on said reactant mass, and decomposing the resulting reaction compound with water to form said ketones.

6. A process for the production of valuable products comprising ketones relatively free from gums, resins and other undesirable difficultly separable polymerized products from saturated non-aromatic hydrocarbons containing at least one tertiary carbon atom comprising reacting said hydrocarbons with an aluminum compound of a non-gaseous halogen and with carbon monoxide while withdrawing sufficient heat from the reactant mass to maintain a temperature below 0° C., maintaining pressure on said reactant mass, and decomposing the resulting reaction compound with water to form said ketones.

ALFRED SCHAARSCHMIDT.